United States Patent [19]

Heil et al.

[11] Patent Number: 5,216,082

[45] Date of Patent: Jun. 1, 1993

[54] ACRYLIC MOLDING COMPOSITIONS

[75] Inventors: Ernst Heil, Stockstadt; Uwe Numrich, Weiterstadt; Walter Schellhaas, Zwingenberg; Barbara Geppert, Wiesbaden; Thomas Rhein, Stadecken-Elsheim, all of Fed. Rep. of Germany

[73] Assignee: Röhm GmbH, Darmstadt, Fed. Rep. of Germany

[21] Appl. No.: 815,594

[22] Filed: Dec. 27, 1991

Related U.S. Application Data

[63] Continuation of Ser. No. 452,724, Dec. 18, 1989, abandoned.

[30] Foreign Application Priority Data

Dec. 20, 1988 [DE] Fed. Rep. of Germany ....... 3842796

[51] Int. Cl.$^5$ ................. G06F 265/64; G06F 265/66; G62L 33/08
[52] U.S. Cl. ..................................... 525/222; 525/369
[58] Field of Search ............................... 525/222, 309

[56] References Cited

U.S. PATENT DOCUMENTS

| | | | |
|---|---|---|---|
| 3,808,180 | 4/1974 | Owens | 260/885 |
| 3,812,205 | 5/1974 | Dunkelberger | 260/885 |
| 3,843,753 | 10/1974 | Owens | 260/876 R |
| 3,988,392 | 10/1976 | Kaneda et al. | 525/224 |
| 4,115,480 | 9/1978 | Konoshita et al. | 260/885 |

OTHER PUBLICATIONS

Pocket Oxford German Dictionary, 3rd Edition, Oxford University Press, Oxford, pp. 225, 115.

Primary Examiner—James J. Seidleck
Assistant Examiner—W. R. H. Clark

[57] ABSTRACT

A clear impact resistant molding compound which does not become cloudy under either the influence of heat or moisture or on weathering and is composed according to the invention of:

A) 10 to 90 percent by weight of a continuous rigid phase, essentially of methyl methacrylate, having a glass transition temperature greater than 70° C. and B) 90 to 10 percent by weight of an elastomeric phase, distributed in the rigid phase and partly bound thereto, having a glass transition temperature below −10° C., an average particle size of the elastomeric phase below 130 nm, and an inhomogeneity, U, of the elastomeric phase particle size of less than 0.5, comprising at least 50 percent by weight of B) of a lower alkyl acrylate and 0.5–5 percent by weight of a graft cross linking agent or an at least trifunctional cross linking agent, C) not more than 0.05 percent by weight of water soluble components, where $U = D_w^3/D_n^3 - 1$ $D_w$ and $D_n$ are, respectively the weight average- and number average-values of the particle size,
films prepared from such a molding compound;
multilayer shaped bodies wherein at least one layer is of such a molding compound;
methods for making such molding compounds, films, and shaped bodies.

2 Claims, No Drawings

ACRYLIC MOLDING COMPOSITIONS

This application is a continuation of application Ser. No. 07/452,724 filed Dec. 18, 1989, now abandoned.

The present invention pertains to clear impact resistant acrylate molding compounds, to films prepared therefrom, to multilayered shaped bodies, and to methods for making said molding compounds and shaped bodies.

STATE OF THE ART

Impact resistant acrylate molding compounds are already known from U.S. Pat. No. 3,808,180 and 3,843,753, which compounds, by suitable choice of the components, can be clear. However, the clarity is easily lost under conditions which often arise in the use of the objects made therefrom. Thus, the compounds become clouded or white under the influence of high temperatures or high atmospheric humidity, or clouded or white areas appear as a result of the influence of impact or bending stresses.

The known molding compounds consist of a multiphase emulsion polymer, wherein one phase consists of a hard thermoplastic methacrylic ester polymer and the other phase consists of an acrylic elastomer distributed therein as particles 50 to 300 nonometers (nm), preferably 160 to 200 nm, in size. Preparation occurs by two-stage emulsion polymerization in which first a latex of the acrylic elastomer, the so-called elastomeric phase, is created and in the second stage the hard methacrylic ester polymer is graft polymerized thereon. This is designated as the rigid phase. Characteristic of the acrylic elastomer created in the first stage is a glass transition temperature below $-10°$ C. It is synthesized from at least 50 percent by weight of an alkyl- or aralkyl-acrylate, up to 10 percent by weight of a hydrophilic comonomer, as well as 0.05 to 5 percent by weight each of a polymerization cross linking agent and a graft cross linking agent. Further, a small amount of styrene is usually included in order to conform the index of refraction of the elastomeric phase to that of the rigid phase, in this way to avoid a cloudiness of the material by light dispersion at the surfaces of the particles of the elastomeric phase. The aforementioned graft cross linker has the effect that at least 20 percent of the rigid phase created in the second stage is grafted to the elastomeric phase, i.e. is covalently bonded therewith.

The known method permits such extensive freedom of choice in the qualitative and quantitative selection of components for the synthesis that it is impossible in practice to prepare and test all of the clearly differentiated possible variations.

A further possible variation is offered by U.S. Pat. No. 3,843,753 in which the two phase polymer is mixed in a melt with a further thermoplastic molding compound.

One skilled in the art who would like to prepare molding compounds having specific combinations of properties according to the teaching of these patents is dependent either on preparing by planned variation a large number of test products, if he is not successful in obtaining the required properties by a lucky stroke, or must work out new understandings of the dependence of the desired properties on the structure of the two-stage polymer.

PROBLEM AND SOLUTION

The invention has as its basic problem to avoid or minimize the aforementioned susceptibility of the molding compound to clouding or discoloration under the influence of heat and moisture or on weathering, and the so-called white break under the influence of impact or flexing stresses. The problem could only first be solved after it was recognized that the aforementioned properties are complexly interdependent on the particles size of the elastomer phase, the inhomogeneity of the particle size, the minimum content and the kind of the cross linking monomers, and the content of water soluble materials. Further it was determined that the goal could not be reached by the use of styrene or other vinyl aromatics in the elastomeric phase, so that an approximation of the optical indices of refraction of the two phases was not to be realized by the addition of expensive monomer components. In the preferred molding compounds according to the invention, a difference in the indices of refraction of the two phases of greater than 0.02 has been found, which, according to the experience of one skilled in the art, must unavoidably lead to turbidities.

All the more surprising was the discovery that the molding compounds according to the claims not only are clear and colorless after molding, but that these properties are also retained under the influence of heat and moisture, on weathering, and under impact and flexing stresses.

In order to assure optical clarity in the original state, a particle size of the elastomeric phase below 130 nm proved to be essential, but alone is insufficient. Only by adjustment of the inhomogeneity of the particles of the elastomeric phase below 0.5, preferably below 0.2, is clarity achieved. The particle size is defined as the weight average value of the particle size ($d_{50}$) determined by the ultracentrifugation method of Scholtan and Lange, giving the weight precentages of particles below a given diameter expressed as $d_n$, wherein d is the diameter and n is the percentage. Thus, $d_{50}$ means that 50 percent by weight of the particles have a diameter equal or less than $d_{50}$. the homogeneity, U, is defined as $U=(d_{90}-d_{10})d_{50}$. Whereas according to U.S. Pat. No. 3,808,180 a fraction of the elastomeric phase of 0.5 percent by weight is sufficient, it has proved in the scope of the present invention that a minimum fraction of 10 percent by weight is mandatory.

A critical selection from the viewpoint of the kind and amount of the cross linking monomers also proves to be essential. The aforementioned patents differentiate between cross linking agents and graft cross linking agents and characterize both groups as indispensable. To the group of cross linkers belong monomers which contain at least two acrylic or methacrylic groups; they are introduced into the elastomeric phase in an amount of 0.5 percent by weight in the U.S. patents. As graft crosslinkers are designated those monomers which in addition to an acrylic or methacrylic group contain an ethylenically unsaturated group of a clearly smaller tendency to polymerize, as a rule an allyl group. The amount of this monomer in the elastomeric phase is chosen between 0.2 and 0.4 percent by weight.

In order to reach the goal of the invention, the amount of the graft cross linker must be raised to at least 0.5 percent by weight, better to 1 to 4 percent by weight of the elastomeric phase. However it can be replaced with equally good effect by monomers which contain three or more acrylic or methacrylic groups in the molecule. In contrast, non-graft cross linkers have proved to be superfluous, even if desirable in an amount of 0.05 to 2 percent by weight in the elastomeric phase in some cases.

It has further been determined that the amount of water soluble components in the molding composition must be kept below 0.05 percent by weight in order to ensure lasting clarity, particularly under the influence of moisture. Water soluble components are introduced into the molding composition in the form of residues of the polymerization initiator, such as the peroxydisulfates, or of the emulsifying agent. This is primarily the case in the usual procedure in which the aqueous phase of the basic latex is separated from the emulsion polymer by evaporation, for example in a spray drying process. This method is in use in some of the illustrative examples of the U.S. patents, whereas in other examples an essential part of the aqueous phase is separated from the melt of the emulsion polymer in liquid form. In this way the principal portion of water soluble components of the latex is also removed.

It has been found that the sensitivity to clouding under the influence of moisture disappears if in the preparation of the molding compound the latex is coagulated and the aqueous phase is separated in liquid form so extensively from the coagulate that not more than 0.05 percent by weight of water soluble components remain behind in the molding compound. This procedural step is of considerable significance according to the invention, because a relatively large amount of water soluble emulsifiers must be used for bringing about the necessary small particle size, which amount of emulsifiers, without careful separation from the molding compound, would lead to strong subsequent clouding under the influence of moisture.

Only the described combination of selective steps with regard to the relative amounts of the phases, to the particle size of the emulsion polymer, to the kind and amount of cross linking monomer, to the final content of water soluble components, and to the method techniques necessary therefor, leads to the product according to the invention and to its outstanding properties. The chosen characteristics are per se known in the art in other combinations.

Preparation of the Emulsion Polymer

An at least two phase emulsion polymer which can be worked up as such or in admixture with another molding compound to produce shaped products is the basis of the clear impact resistant molding compounds according to the invention. The inclusion of further phases in order to produce additional effects is possible only to the extent that the special advantages of the products of the invention are not destroyed.

The rigid phase of the emulsion polymer has a glass transition temperature of at least 70° C. and can be composed solely of methyl methacrylate. As comonomers, lower alkyl acrylates, particularly those having 1 to 4 carbon-atoms in the alkyl portion, can be optionally present up to an amount of 20 percent by weight, calculated on the rigid phase, so long as the glass transition temperature is not below the aforementioned limit. At least 0.5 percent by weight of alkyl acrylates is desirable.

The elastomeric phase is at least 50, preferably to more than 80 percent by weight, composed of lower alkyl acrylates, from which a glass transition temperature below −10° C., as a rule from −20° C. to −80° C., results. So long as the required glass transition temperature is achieved, other free radically polymerizable aliphatic comonomers, which can be copolymerized with alkyl acrylates, can optionally be used, as in known in the state of the art. They may be present in an amount of 0.5 percent by weight or more. However, more than insignificant amounts such as 2 percent by weight, of aromatic comonomers such as styrene, α-methyl styrene or vinyl toluene remain excluded because they —particularly on weathering —lead to undesirable properties in the molding compounds.

The amount of graft cross linker, or of cross linker having three or more ethylenically unsaturated free radically polymerizable groups which can be used instead, is so chosen between the limits of 0.5 to 5 percent by weight that in the finished emulsion polymer at least 15 percent by weight of the rigid phase is covalently bonded to the elastomeric phase. The degree of bonding is evident on dissolving an aliquot amount of the emulsion polymer in a solvent for the rigid phase. In this case, the elastomeric phase and the amount of the rigid phase covalently bonded therewith remain undissolved. The weight of the undissolved amount must be at least 15, preferably 30 to 80 percent by weight, greater than the calculated weight of elastomeric phase of the aliquot sample. The amount of the graft cross linker may, however, in no case be below 0.5 percent by weight and preferably is in the region from 1 to 4 percent by weight.

The amount of the graft cross linker in the emulsion polymers of the invention is relatively high and as a rule leads to a sufficient cross linking of the elastomeric phase so that an auxiliary cross linker is superfluous. If in this way the desired impact resistance properties are not achieved, then the use of 0.05 to 2 percent by weight of a cross linker in the elastomeric phase, in addition to the graft cross linker, is indicated. The cross linker must in this case contain at least two acrylic or methacrylic groups.

As a graft cross linker, the allyl esters of acrylic or methacrylic acid are preferred; however other of the graft cross linkers mentioned in U.S. Pat. No. 3,808,180 and U.S. Pat. No. 3,843,753 are also suitable. To the cross linkers having three or more ethylenically unsaturated free radically polymerizable groups such as allyl groups or acrylic or methacrylic groups which can instead be used, belong triallyl cyanurate, trimethylolpropane triacrylate and trimethacrylate, pentaerythritol triacrylate and trimethacrylate, and related compounds for which further examples are given in German 33 00 526.

The two- or multi-phased emulsion polymer is prepared in the usual manner by two- or multi-stage emulsion polymerization in an aqueous phase. The elastomeric phase is prepared in the first stage. For this, special attention must be devoted to the right adjustment of the particle size and of the inhomogeneity of the particle size. Although known methods involving addition of a seed latex or with gradual addition of monomer are usable in principle, the properties sought to be achieved according to the invention are best reached by a method in which the monomer mixture for the elastomeric phase is emulsified in toto and polymerized.

The particle size of the elastomeric phase essentially depends on the concentration of the emulsifier. Particles having an average particle size (weight average value) below 130 nm, preferably below 70 nm, and with an inhomogeneity of the particle size below 0.5, preferably below 0.2, are achieved at emulsifier concentrations of 0.15 to 1.0 percent by weight, calculated on the aqueous phase. With smaller amounts of emulsifier, a larger average particle size results; with larger amounts of emulsifier, a greater inhomogeneity. The inhomogeneity is lower —that is the uniformity of the particle size is greater —the shorter the particle-forming phase at the beginning of the emulsion polymerization lasts. Above all, a renewed particle formation after the start of polymerization, as can occur upon subsequent addition of emulsifier, is to be avoided. Also, the rate of polymerization can influence particle size and the inhomogeneity of particle size. If the stream of free radicals is too low, then the inhomogeneity is too high; if the stream is too high, then too great a sensitivity to moisture can result —particularly if polymerization is initiated with peroxy disulfates.

The aforementioned emulsifier concentration is valid primarily for conventional anionic emulsifiers. Among these are, for example, alkoxylated and sulfated paraffins, which are particularly preferred.

As polymerization initiators, 0.01 to 0.5 percent by weight of alkali metal peroxy disulfate or ammonium peroxy disulfate, calculated on the aqueous phase are added, for example, and the polymerization is initiated at temperature from 20 to 100° C. One preferably works with redox systems, for example comprising 0.01 to 0.05 percent by weight of organic hydroperoxides and 0.05 to 0.15 percent by weight of rongalite, at temperatures from 20° C. to 80 ° C.

It is mandatory to check the choice of the appropriate polymerization conditions by measurement of the average particle size and of the inhomogeneity in a trial batch and, if necessary, to alter it according to the rules mentioned above. Both quantities can be calculated according to known methods from the result of light scattering measurements and by ultracentrifugation of the finished latex.

Working up of the Emulsion Polymer to a Molding Compound

The emulsion polymer is produced in the form of an aqueous dispersion having a solids content of 30 to 60 percent by weight, of which, as a rule, more than 0.05 percent by weight calculated on the solids, is water soluble components. According to the invention, the water soluble components are separated from the emulsion polymer by coagulating the dispersion, separating the liquid aqueous phase from the coagulate, and melting the coagulate to give a molding compound.

For this step, an extruder, particularly a twin screw-degassing extruder, is advantageously used. The dispersion is pumped into the extruder as a liquid and coagulated at a temperature above the glass transition temperature of the emulsion polymer by the combined influence of heat and shearing forces. The aqueous phase remains liquid even above 100° C. as a result of the pressure prevailing in the extruder and is separated under pressure through a slit or a sieve plate in the extruder housing together with the dissolved components. Suitable methods and apparatus are known, for example, from German 27 50 682 and U.S. Pat. No. 4,110,843. A possible residual content of water can be evaporated in known fashion in a degassing zone of the extruder.

The molten molding compound is removed from the extruder and granulated or formed into a strand having an arbitrary desired cross section and then cooled below the softening point (glass transition temperature).

Often it is desired to mix the impact resistant molding compound with a possibly predominant amount of another hard molding compound compatible therewith. At a solids ratio of 10 : 1 to 1 : 10, the properties of the molding compound of the invention are clearly evident in the resulting mixture, particularly in the form of an improved resistance to heat and improved adaptability to stamping, together with the advantageous properties that are characteristic of the molding compound of the invention itself. Preferably the mixing component is a polymethyl methacrylate molding compound. Also hard copolymers of methyl methacrylate with acrylic esters, acrylonitrile, or with maleic acid anhydride and styrene, as well as polyvinyl chloride, come into consideration.

Such mixtures can be prepared in different ways. For example, one can mix the dispersion of the emulsion polymer prepared according to the invention with an aqueous dispersion of the mixing component and coagulate the mixture, separate the aqueous phase, and melt the coagulate into a molding compound. In this method, a particularly uniform admixture of the two molding compounds is achieved. A similarly good admixture is obtained if the aqueous dispersion of the emulsion polymer prepared according to the invention is pumped into an extruder which contains a melt of the mixing component. The dispersion is coagulated in the melt and the aqueous phase is pressed out as described above. The components can also be separately prepared and isolated and mixed in the form of their melts or as powders or granulates and homogenized in a multi-screw extruder or on a rolling mill.

Conventional additives can be added in whichever formulating step is suitable therefor. Among these are dyes, pigments, fillers, reinforcing fibers, lubricants, UV-protective agents, etc. Polymerizable UV-absorbers can be copolymerized into the emulsion polymer during the polymerization of the rigid phase monomers.

Imparting Form to the Molding Compounds

If the clear impact resistant molding compound according to the invention contains a high content of the elastomeric phase, within the claimed scope therefor, it is suitable for the preparation of clear pliable films by extrusion of the melt through a slit nozzle and smoothing on a rolling mill. Such films are characterized by lasting clarity, lack of sensitivity to heat and cold, resistance to weathering, and by small white break on bending or folding, and are thus suitable for use as windows in awnings, automobile coverings, or sails. Such films have a thickness less than 1 mm, for example 0.05 to 0.5 mm.

An important field of use is in the formation of thin surface coatings of, e.g., 0.05 mm to 0.5 mm thickness on rigid, form-retaining substrate bodies such as sheet metal, cardboard, fiberboard, synthetic resin sheets, and the like. In this case, the amount of the elastomeric phase can be essentially lower and as a result the molding compound can be harder. For the preparation of such coatings, different methods are available. Thus, the molding compound can be extruded as a film, smoothed, and laminated to the substrate. Using the technique of extrusion coating, an extruded strand can be applied to the surface of the substrate and smoothed by means of a roll. If the substrate itself is a thermoplastic synthetic resin, the possibility exists for coextrusion of both materials with formation of a surface layer of the clear molding compound of the invention.

Mixtures of the impact resistant molding compound, particularly with polymethyl methacrylate, serve for the preparation of shaped bodies having a wall thickness greater than 1 mm, e.g. of extruded webs having a thickness of 1 to 10 mm, which can be easily stamped and for example are useful for the preparation of printable screens for electric apparatus or for the preparation of injected shaped bodies of high quality, e.g. windows for automotive vehicles.

A better understanding of the present invention and of its many advantages will be had by referring to the following Examples, given by way of illustration.

EXAMPLE 1

A 60 percent emulsion I, adaptable to preparing an elastomeric phase A), was prepared by emulsification of

| | |
|---|---|
| 99 | parts by weight of butyl acrylate |
| 1 | part by weight of triallyl cyanurate |
| 0.12 | part by weight of tert.-butyl hydroperoxide |
| in 67 | parts by weight of a 0.15 percent aqueous solution of sodium lauryl sulfate. |

A 50 percent emulsion II, adaptable to preparing a rigid phase B), was prepared by emulsification of

| | |
|---|---|
| 96 | parts by weight of methyl methacrylate |
| 4 | parts by weight of butyl acrylate |
| 0.4 | part by weight of dodecyl mercaptan |
| 0.1 | part by weight of tert.-butyl hydroperoxide |
| in 100 | parts by weight of a 0.06 percent aqueous solution of sodium lauryl sulfate. |

60 parts by weight of an aqueous phase which contained 1 percent by weight of sodium lauryl sulfate, 0.15 percent by weight of rongalite, 0.02 percent by weight of acetic acid, and 0.0008 part by weight of iron-II-sulfate were introduced into a polymerization vessel equipped with stirrer, exterior cooling, and a vessel for introducing further reagents. 50 parts by weight of Emulsion I were added over a period of 2 hours with stirring at a temperature of 55° C. The resulting elastomeric phase polymer had a glass transition temperature of −35° C. Subsequently, 140 parts by weight of emulsion II were added over a further 2 hours, whereby the rigid phase polymer having a glass transition temperature of 90° C. was formed. The difference in the optical refractive indices of the two phases was 0.021. An aqueous dispersion having a solids content of 40 percent by weight formed. By solubility measurements on a coagulated polymer sample, it was determined that 25 percent by weight of the rigid phase was bound to the elastomeric phase.

The particles of the elastomeric phase formed from Emulsion I had, after conclusion of the first polymerization stage, a weight average particle size value of 60 nm, which increased to 88 nm on polymerization of Emulsion II in the second stage. The particle sizes were determined according to a light scattering method using a "Nanosizer" apparatus of Coulter Electronics. The inhomogeneity of the elastomeric phase, determined by ultracentrifugation, was $U_{50}=0.12$.

To isolate the solids from the dispersion obtained, a closely meshing opposing twin screw extruder having a screw diameter D = 30 mm was used. The divisions of length were in each case given as a multiple of the diameter D. The screws were sealed to the drive with a gland.

The coagulation zone had a length of 25 D. It was operated at a pressure of 40 bar and a temperature of 220° C. Coagulation was effected by the combined influence of heat and shearing.

Every hour, 4 kg of the dispersion were continuously pumped into the coagulation zone with a reciprocating dosing pump. In a 2 D-long section of the extrusion cylinder behind the coagulation zone, the aqueous phase separated in the coagulation was removed in liquid form by way of a water drainage opening, a pressure chamber, and a pressure retaining valve set at 25 bar. In a following unpressurized degassing zone 5 D in length, the remaining moisture content of about 10 percent of the polymer weight was removed in vapor form. In a following pressure zone having a length of 5D, the polymer was led at a temperature of 200° C. to a granulating nozzle. The exiting strand was cooled and granulated after solidifying.

The molding compound obtained had a content of water soluble components of less than 0.05 percent by weight. It was extruded into a film 0.05 mm thick and calendered. No whitening appeared within 30 minutes in an atmosphere at 100° C. having a relative humidity of 100 percent. On bending or folding of the film, no white break is recognizable. The film can be stamped without breaking. Sharp clear stamping edges are formed which are neither frayed nor whitened. The film can be adhesively laminated to a plate of hard PVC by heat embossing.

Comparison Tests

A portion of the dispersion obtained in Example 1 was dehydrated by spray drying. The dry product contained 0.4 percent by weight of water soluble components. A film prepared therefrom became cloudy in a moist atmosphere under the above described conditions.

If the triallyl cyanurate content in the process of Example 1 is reduced from 1 to 0.3 part by weight, the molding compound obtained is cloudy. Only 22 percent by weight of material insoluble in acetone were found, which leads to the conclusion that only a part of the elastomeric phase was cross linked and the rigid phase was practically not at all bound to the elastomeric phase.

In a further variation of Example 1, 0.10 instead of 1.0 part by weight of sodium lauryl sulfate was added to the aqueous phase initially introduced into the polymerization vessel. As a result, the average particle size of the elastomeric phase particles increased to 132 nm and the inhomogeneity of the rigid phase particle size increased to 0.52. The molding compound produced was cloudy.

EXAMPLE 2

2 parts by weight of the dispersion obtained in Example 1 and 1 part by weight of a 40 percent anionically emulsified aqueous emulsion polymer having a composition exactly corresponding to that of the rigid phase of the dispersion of Example 1 were intimately admixed and the mixture was dehydrated as in Example 1 in a twin screw extruder. The amount of the elastomeric phase in the molding compound obtained amounted to 20 percent by weight. The heat resistance was at 95° C., which is 7° C. greater than for the molding compound of Example 1.

A 1 mm thick, very rigid film was extruded from this molding compound, which film could readily be stamped. The film is useful, for example, for the preparation of stamped armature screens for automotive vehicles, electric apparatus, and the like.

EXAMPLE 3

In a repetition of the method of Example 1, the triallyl cyanurate in Emulsion I was replaced by the same amount of allyl methacrylate as a graft cross linker. The molding compound obtained corresponded in all properties with those of Example 1.

EXAMPLE 4

For two batches prepared according to Example 3, an additional 2.5 and 5 parts by weight, respectively, of an emulsion polymer of methyl methacrylate in the form of a seed latex having a particle size of 40 nm (weight average) were added to the aqueous phase initially present in the polymerization vessel. In this way, the following particle sizes were obtained:

| Seed latex particles | 2.5 pbw | 5 pbw |
|---|---|---|
| Elastomeric phase diameter | 75 nm | 94 nm |
| Total diameter | 108 nm | 137 nm |

EXAMPLE 5

In a further variant of the method of Example 3, the following amounts of the Emulsions I and II were introduced:

83 pbw Emulsion I and 100 pbw Emulsion II. As a result, the molding compound had a composition of 50 percent by weight of elastomeric phase and 50 percent by weight of rigid phase. The following particle sizes were measured:

| Elastomeric phase diameter | 110 nm |
|---|---|
| Total diameter | 140 nm. |

The resistance to heat of the molding compound was 55° C. The molding compound is clear, does not become cloudy in a moist atmosphere, shows no white break in the form of a film 0.05 mm thick, and can be flawlessly stamped.

EXAMPLE 6

A melt of polycarbonate resin (grade 3103 From Bayer AG, Germany) to the feed block of a coextrusion die al a rate of 410 kq/h. The temperature of the melt was 272° C. At the same time a melt of the acrylic resin of Example I was Fed to the feed block at a rate of 21 kg/h at a temperature of 268° C. Both melt streams were joined in the feed block and were Fed to a coathanger-type sheet die. The temperatures of Feed block and die were adjusted to 265° C. The coextruded web was smoothed in a roll stack. The acrylic layer was tightly bonded to the PC-layer. The produced sheet was 1020mm wide and 4.1 mm thick from the feed ratio, an average thickness of the acrylic resin layer of 0.1 mm was calculated. The produced sheet had high surface gloss on both sides and high transparency.

What is claimed is:

1. A clear impact resistant molding compound containing
   A) 10 to 90 percent by weight of a coherent rigid phase having a glass transition temperature above 70° C., said rigid phase comprising
      a) 80 to 100 percent by weight of A) of methyl methacrylate and
      b) 20 to 0 percent by weight of A) of a lower alkyl acrylate, and
   B) 90 to 10 percent by weight of an elastomeric phase distributed in said rigid phase and having a glass transition temperature below −10° C., an average particle size below 130 nm, and an inhomogeneity of the elastomeric particle size of less than 0.2, said elastomeric phase comprising
      i) at least 50 percent by weight of B) of a lower alkyl acrylate,
      ii) 0.5 to 5 percent by weight of B) of a graft cross linking agent having two unsaturated groups, one of which is an acrylic or methacrylic group and the other of which is an allyl group, or of a cross linking monomer having three or more ethylenically unsaturated free radically polymerizable groups, and
      iii) 0 to 49.5 percent by weight of B) of at least one further different ethylenically unsaturated aliphatic compound copolymerizable with a) and b), but no more than 2 percent by weight of aromatic comonomers, and
   C) not more than 0.05 percent by weight of water soluble components,
   whereby at least 15 percent by weight of said rigid phase is covalently bonded with said elastomeric phase and wherein said rigid phase and said elastomeric phase have a difference between their refractive indices greater than 0.02.

2. A molding compound as in claim 1 wherein said elastomeric phase B) contains from 0.05 to 2 percent by weight of B) of a cross linking agent as component iii) or as part thereof.

* * * * *